Figure 1:

(No Model.)

R. M. HUNTER.
TROLLEY WIRE SUPPORT.

No. 514,932. Patented Feb. 20, 1894.

Attest

Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

TROLLEY-WIRE SUPPORT.

SPECIFICATION forming part of Letters Patent No. 514,932, dated February 20, 1894.

Application filed June 30, 1893. Serial No. 479,211. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways, and consists of certain improvements which are fully set forth in the following specification and shown in the accompanying drawings which form a part thereof.

This application, Case No. 258, has particular reference to the suspended conductor of a trolley electric railway, and comprehends certain features more specifically relating to the method of suspending the trolley wire.

Heretofore it has been customary to provide hangers upon the top of the trolley wire which extend upwardly and connect with insulators or other means of attachment with the cross wires. It was necessary to connect the cross wire at a distance above the trolley wire so as to permit the flange of the trolley wheel to pass along the wire.

In carrying out my invention, I locate below the trolley wire at the point of suspension a suitable casting or plate tapering at its ends and secured to the under side of the said trolley wire, which latter at this point may be straight or upwardly curved. The cross wire may be connected to the plate at or about the level of the trolley wire, and, if desired, below it. The collector wheel of the trolley runs upon the trolley wire until it reaches the supporting plate, then passes upon the plate which acts as a bridge and is guided at a sufficient distance below the cross wire by the said supporting plate that its flanges do not strike the cross wire which would displace the trolley, and do not wear upon the cross wire, thus overcoming the danger of destroying the support of the trolley wire which would permit it to drop. Furthermore, in the constructions heretofore employed, the trolley wire was supported from the cross wire by means of a soldered joint between the hanger plate or shoe and the trolley wire, the said joint in many cases becoming weakened and permitting the trolley wire to drop or sag so low as to interfere with the operation of the road as well as cause danger to persons and horses traveling beneath. By my improvement this difficulty is entirely overcome, as I preferably support the shoe or suspension plate from the cross wire, and support the trolley wire itself upon the upper edge of the said suspension plate or shoe. The suspension plate may be depressed below the alignment of the trolley wire at the point where the cross wire is located to depress the trolley wheel at this point, or, if desired, the trolley wire may be bent upward so that the lower edge of the trolley wire and plate or shoe is in the same horizontal plane and the trolley permitted to pass freely along without changing its elevation.

My invention may be carried out in various ways, and will be better understood by reference to the accompanying drawings, in which—

Figure 2:
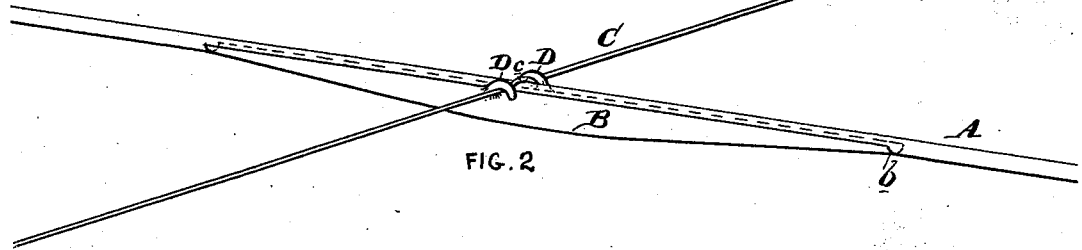
Figure 3:
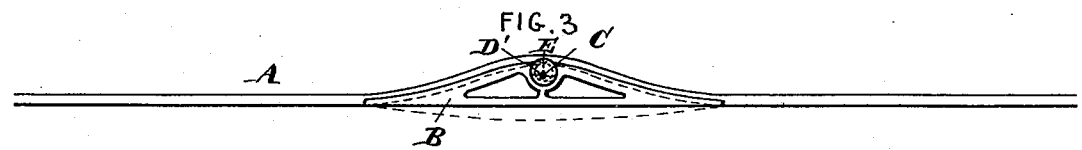
Figure 4:
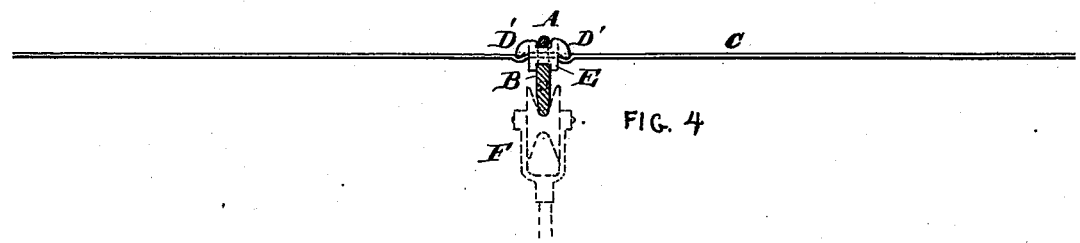
Figure 5:
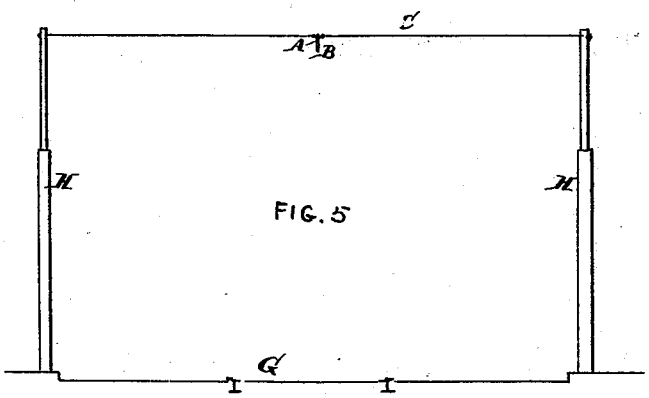

Figure 1 is a side elevation of my improved trolley wire support with the cross wire in section. Fig. 2 is a perspective view of one form of my improvement. Fig. 3 is a side elevation of a modification thereof. Fig. 4 is a transverse section at the middle of the supporting shoe or plate of Fig. 3 slightly modified; and Fig. 5 is a transverse section of an electric railway illustrating the application of my improvement thereto.

A is the trolley wire and B is the supporting plate or shoe which is preferably grooved upon its upper part, in which groove the trolley wire A is received and preferably soldered.

The supporting plate or shoe B may be provided with suitable means for attaching it to the cross wire C. In Figs. 1 and 3 this means is shown as two upwardly extending hooks D, D, arranged respectively upon the opposite sides of the trolley wire. The cross wire C is hooked under these hooks from opposite sides, and that portion of the cross wire intermediate of the hooks D, D, has an upward bend at *c* by pressing upon the upper part of the trolley wire A. This securely clamps the trolley wire to the shoe and besides puts a kink in the cross wire C which prevents the lateral shifting of the trolley wire under the action of the wind. With this construction the cross wire is not insulated from the trolley wire, but suitable insulators may be placed in the cross wire C adjacent to its connection with the poles H, or otherwise as is customary. The lower part of the supporting shoe or plate B is depressed sufficiently to cause the flanges of the trolley wheel to pass freely below the cross wire C. It will be seen from this construction that the weight of the trolley wire A is received upon the shoe or plate B and there is no possibility for it to drop or any tendency for the soldered joint to become destroyed.

In place of making the lower portion of the shoe B curved downward, I may form the shoe of substantially the construction shown in Figs. 3 and 4, in which the shoe is curved upon its upper part and straight upon its bottom, and the trolley wire is provided with an upward curve to correspond with the upper edge of the shoe and rests in the groove as in the case of Figs. 1 and 2. The upper part of the shoe is provided with means for attachment of the cross wire C which may be as shown in Figs. 1 and 2, or, if desired, an insulator E may be placed in or secured to the shoe, and provided, if desired, with downwardly extending lugs D' under which the cross wire C passes and by which kinks are put therein to prevent the trolley wire shifting as in the former case. The insulator E should preferably be secured firmly to the supporting shoe or plate B, but, if desired, it may simply be placed in a groove in the plate B and held therein by the trolley wire A. In this case it would be essential that the plate or shoe B was firmly soldered to the trolley wire A. The insulator E may be of any suitable construction.

An examination of Fig. 3 will show that there would be a straight under surface against which the trolley wheel would run, thus overcoming the necessity of depressing it at the point where the cross wires C are located, as would be required with the construction shown in Figs. 1 and 2.

It is quite evident that the lower part of the plate B may be curved downward corresponding to Figs. 1 and 2 in a measure as is indicated in dotted lines in Fig. 3. This latter construction is shown in the cross section of Fig. 4 where the trolley wire is dotted in its level position at the rear, and that portion between the dotted circle and the bottom of the cross sectional part indicates the extent of the downwardly projected portion of the supporting shoe or plate.

F indicates the trolley.

In Fig. 5, G is the railway track which commonly acts as the return conductor. H, H, are the supporting poles arranged upon each side of the street. C is the cross wire. A is the trolley wire, and B is the supporting plate or shoe.

I do not confine myself to any particular construction as to details, as these may be modified in various ways without departing from the principles of my invention.

What I claim as new, and desire to secure by Letters Patent, is—

1. The combination of a trolley wire, with a vertical support arranged upon the under side thereof and upon which the trolley runs, a transverse wire for supporting the trolley wire connected to the support, and a trolley wheel making an under running contact and having its axis at right angles to the plane of the support.

2. The combination of a trolley wire, with a support arranged upon the under side thereof upon which the trolley moves provided with a groove in which the trolley wire is received, and a transverse wire for supporting the trolley wire and support.

3. The combination of a trolley wire, a support soldered to the under side thereof, and a transverse supporting wire arranged at or about the level of the trolley wire for sustaining the said trolley wire and support.

4. The combination of a trolley wire, with a bridging support secured to the under side of the trolley wire at one place in its length and provided with an unobstructed lower conducting surface, whereby the trolley wheel or contact may pass freely along the under side of the trolley wire and support without interrupting the circuit.

5. The combination of a trolley wire, with a bridging support secured to the under side of the trolley wire at one place in its length and provided with an unobstructed lower conducting surface whereby the trolley wheel or contact may pass freely along the under side of the trolley wire and support without interrupting the circuit, and a supporting transverse or cross wire arranged at or about the level of the trolley wire for sustaining the trolley wire and supports.

6. The combination of a trolley wire, with a bridging structure secured to the under side of the trolley wire at one place in its length and provided with an unobstructed lower conducting surface having its ends on a level with the under side of the trolley wire, whereby the trolley wheel or contact may pass freely along the under side of the trolley wire without interrupting the circuit.

7. The combination of a trolley wire, a vertical supporting structure upon the under side thereof for guiding the trolley wheel, a supporting transverse or cross wire, an interposed insulating connection, and a trolley wheel making an under-running contact with the trolley wire and having its axis at right angles to the plane of the supporting structure, whereby the trolley wire and shoe are sustained from the transverse or cross wire and the trolley wheel is free to pass below the transverse or cross wire while running upon the supporting structure.

8. The combination of a trolley wire, a supporting structure arranged upon the under side thereof and provided with means for attachment to a transverse or cross wire, and a transverse or cross wire secured at or about the level of the trolley wire and to the supporting structure.

In testimony of which invention I have hereunto set my hand.

R. M. HUNTER.

Witnesses:
ERNEST HOWARD HUNTER,
C. M. DIETTERICH.